T. T. AND J. W. WATSON.
A. H. WATSON, EXECUTRIX OF T. T. WATSON, DEC'D.
MILEAGE INDICATOR FOR TIRES.
APPLICATION FILED SEPT. 11, 1916.

1,343,535.

Patented June 15, 1920.

INVENTORS
Thomas Theodore Watson,
John Warren Watson.

WITNESS
F. J. Hartman

BY
Fraser & Blower
ATTORNEYS

UNITED STATES PATENT OFFICE.

THOMAS THEODORE WATSON AND JOHN WARREN WATSON, OF WAYNE, PENNSYLVANIA; ANNIE HODSON WATSON EXECUTRIX OF SAID THOMAS THEODORE WATSON, DECEASED.

MILEAGE-INDICATOR FOR TIRES.

1,343,535.   Specification of Letters Patent.   Patented June 15, 1920.

Application filed September 11, 1916. Serial No. 119,405.

*To all whom it may concern:*

Be it known that we, THOMAS THEODORE WATSON and JOHN WARREN WATSON, both citizens of the United States, and residents of Wayne, in the county of Delaware and State of Pennsylvania, have invented certain new and useful Improvements in Mileage-Indicators for Tires, of which the following is a specification, reference being had to the accompanying drawing.

A principal object of our invention is to provide means for indicating the distance which has been traveled by a vehicle tire, and more especially a pneumatic tire such as is commonly used upon automobiles, so that when the tire is presented to the manufacturer for adjustment or replacement, the manufacturer may readily ascertain with substantial accuracy the distance which the tire has in fact traversed. For the purpose of carrying out our invention we employ the forces of acceleration and retardation coincident with the cycloidal or prolate-cycloidal movement of a point on a vehicle tire when in use, as well as the force of gravity, to produce, through relative movement and impact of suitable elements, alteration in the form of a malleable substance to indicate the extent of the tire travel. As far as we are aware, it is broadly new to thus employ the said forces in the manner and for the purpose indicated, and while to enable those skilled in the art to practice the invention we have hereinafter illustrated and described certain preferred embodiments thereof, we nevertheless do not limit ourselves to the employment of any specific means for carrying out the invention, as we may utilize any means or instrumentalities suitable for effecting the results desired.

Besides the principal object to which reference has already been made, our invention further includes all of the other various novel objects and features of construction and arrangement hereinafter more specifically enumerated and described.

Figure 1:
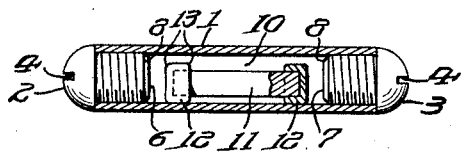
Figure 2:
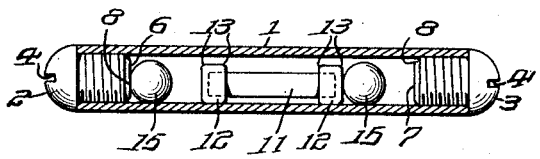
Figure 3:
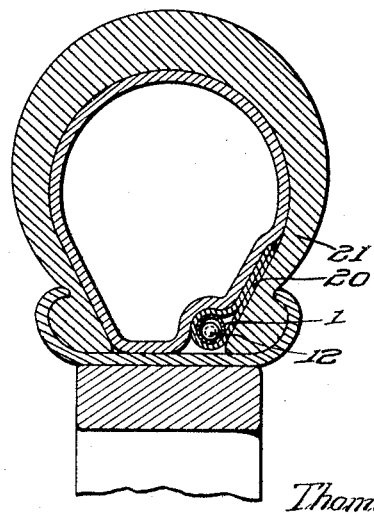

In the accompanying drawing in which we have illustrated certain embodiments of the invention, Figure 1 is a central longitudinal section of one form thereof with certain parts shown in elevation, and Fig. 2 a similar view of a slightly modified form of the invention. In Fig. 3, which is a transverse section through a pneumatic tire in position on the rim of a wheel, is illustrated a preferred manner of operatively attaching the invention to a pneumatic tire although, if desired, other methods of attachment may be successfully employed.

The form of the invention illustrated in Fig. 1 comprises a hollow, preferably cylindrical, casing 1 having its ends closed by plugs 2—3 threaded or otherwise suitably removably secured thereto, the outer extremities of the plugs being preferably provided with slots 4 to facilitate their removal from the casing by means of a screw driver or other suitable instrument. The inner ends 6—7 of the plugs are preferably faced off to present surfaces normal to the longitudinal axis of the casing and slightly chamfered around their peripheries as at 8 for a purpose to be hereinafter described.

Loosely positioned within the chamber 10 formed within the casing is a member 11 hereinafter referred to as the "slug" preferably formed of lead or other malleable material, which as illustrated, may be cylindrical in form and provided at each extremity with a cap 12 of material preferably relatively harder than the body of the slug, as for example, bronze or steel. The ends of the body of the slug are cast or otherwise suitably fixed in the caps, the exterior diameter of which is somewhat less than the interior diameter of the casing, the outer faces of the caps being normal to the longitudinal axis thereof. Preferably the corners 13 of each cap are slightly rounded so that the relative sliding movement of the slug and casing hereinafter described, may not be retarded by the engagement of the sharp or perhaps burred edges of the caps with the interior surface of the casing.

It will be evident that with the parts constructed and assembled as described, the slug may freely move within the casing and relative thereto, so that if the casing is maintained in fixed operative relation with a vehicle tire and the latter rotated, the slug will slide alternately from one end of the chamber 10 to the other under the action of the force of gravity and the accelerating and retarding forces coincident with cycloidal or prolate-cycloidal movement of the casing 1, and alternately strike the inner ends of the plugs 2 and 3, resulting in a gradual shortening of the length of the slug proportional to the number of revolutions made, and consequently the distance traveled, by the tire. The amount of such shortening of the length, or other alteration in the shape, of the slug for any given number of revolutions and consequent mileage, may be readily ascertained and a table constructed showing either graphically, by means of a curve, or in figures, the length of the slug after a tire of a given diameter has traversed varying mileages as, for example, progressively from say two hundred and fifty to five thousand or more miles, so that when a tire carrying one of the indicators is presented for adjustment, the manufacturer after removing the indicator from the tire, taking out one of the plugs, removing the slug and ascertaining its exact length by means of a micrometer or other suitable instrument, may by reference to the table readily ascertain with substantial accuracy the distance which the tire has traversed. The annular spaces formed by the chamfered ends of the plugs adjacent the ends of chamber 10 afford room for the reception of any dust or powdered metal collecting in the chamber from the wearing of the parts or other causes, and which might, if no provision was made for its reception, get between the ends of the slug and the plugs and thus interfere with the successful operation of the invention.

In Fig. 2 is shown a form of our invention which may be employed in cases where the centrifugal force, due to rapid tire revolution, is such as to hinder or entirely prevent the movement of the slug relative to the casing. In this form of the invention as shown in Fig. 2, the various parts are formed substantially as hereinbefore described and indicated on the drawing by similar numbers to those employed for the corresponding parts in Fig. 1. The casing 1, however, may be somewhat lengthened to provide space for a pair of balls 15 of hard material, loosely positioned in the casing between the extremities of the slug and the inner ends of the plugs and freely movable therein, the slug also being preferably freely movable relatively to the casing as in the form of the invention already described. As the relative movement between the balls and the casing is under all conditions a rolling one, as distinguished from the sliding movement between the slug and the casing, the centrifugal force acting on the balls as the tire revolves is never great enough to force them against the casing sufficiently to materially retard their movement relative thereto. Hence, even though the slug be retarded in its movement relative to the casing during the revolution of the tire, or even entirely prevented therefrom, the balls will still be alternately impacted against the ends of the slug, resulting in its gradual shortening proportionately to the distance traveled by the tire as in the form of the invention hereinbefore described and thus affording by the accurate measurement of the slug when removed from the casing, a substantially correct indication of such distance.

While in practice the invention may be attached to the vehicle tire in any suitable or convenient manner, we prefer, as shown in Fig. 3, to inclose the casing in a flap or sack 20 of tire fabric or other suitable material and vulcanize or otherwise secure the same to the interior of the outer casing 21 of the tire in such manner that the indicator will lie adjacent the rim 22 of the wheel when the tire is in position thereon with the longitudinal axis of the casing 1 substantially normal to the radius of the wheel. If desired, the tire manufacturer may provide a suitable seal, or the like, which must be broken in order to remove the mileage indicator from its containing sack 20 so that if a tire is presented for adjustment with the seal broken or defaced the tire manufacturer may refuse to make any adjustment whatsoever.

It will be understood that with tires of varying diameters and with different weights or shapes of slugs and different degrees of relative movement between the slug and the casing, the alteration in the shape of the slug for a given distance traveled by the tire will vary, and hence in practice, the tables hereinbefore referred to will be constructed for tires of different diameters when utilized with indicators having slugs of standard weights and shapes and lengths of travel in order that reference to the tables may afford accurate readings.

While we have herein illustrated and described certain forms of our invention with considerable particularity, we do not, as hereinbefore stated, desire or intend to thereby limit ourselves specifically thereto, as we may employ any instrumentalities and combinations of elements effective through the relative movement and impact of the parts under the action of gravity and the accelerating and retarding forces due to cycloidal or prolate-cycloidal movement of the indicator to alter the form of a malleable substance and thereby afford an indication of tire travel, without departing from the spirit and scope of the invention as defined by the appended claims.

Having thus described our invention, we claim and desire to protect by Letters Patent of the United States:

1. In combination with a vehicle tire, of means fixed with relation to said tire and means movable with respect thereto, adapted to coöperate therewith by impact and actuated by the forces of gravity and acceleration and retardation coincident with the cycloidal or prolate-cycloidal movement during use, to progressively alter the shape of a substance to thereby indicate the extent of tire travel.

2. The combination with a vehicle tire, of means carried thereby comprising relatively movable and impacting parts actuated by gravity and the accelerating and retarding forces coincident with cycloidal or prolate-cycloidal movement to alter the form of a malleable substance and thereby indicate the extent of tire travel.

3. A tire mileage indicator comprising a casing adapted to be attached to a tire, a malleable substance within said casing and means operated by gravity and the forces of acceleration and retardation coincident with the cycloidal or prolate-cycloidal movement of said casing when the tire is in use to cause an alteration in the form of the malleable substance to indicate the distance traveled by the tire.

4. A tire mileage indicator comprising a casing and means including relatively movable and impacting parts actuated by gravity and the forces of acceleration and retardation coincident with the movement of the tire when in use to cause an alteration in the form of one of said parts and thereby afford an indication of the extent of tire travel.

5. A mechanism carried by a vehicle tire comprising an element fixed with relation to the tire, a malleable element, and means actuated by gravity and the forces of acceleration and retardation resulting from the cycloidal or prolate-cycloidal movement of the mechanism to alter the form of said malleable element and thereby indicate the extent of tire travel.

6. A mechanism carried by a vehicle tire including a relatively hard element and a malleable element operating as relatively movable and impacting parts, said operation being actuated by gravity and the forces of acceleration and retardation coincident with the cycloidal or prolate-cycloidal movement of the mechanism during use to thereby alter the form of the malleable element to indicate the extent of tire travel.

7. The combination with a vehicle tire having an outer casing and an inner tube and a tire mileage indicator, of means for operatively securing said indicator to said tire, said means comprising a piece of flexible material doubled upon itself and inclosing said indicator, said material being secured to the interior of said outer casing to support said indicator adjacent the base of said outer casing and between said outer casing and said tube.

8. A mechanism carried by a vehicle tire comprising an element fixed with relation to the tire, a malleable element and means actuated by gravity resulting from the movement of the mechanism during use to alter the form of said malleable element and thereby indicate the extent of tire travel.

In witness whereof, we have hereunto set our hands this 8th day of September, A. D. 1916.

THOMAS THEODORE WATSON.
J. WARREN WATSON.